(12) United States Patent
Moeller

(10) Patent No.: US 10,129,953 B2
(45) Date of Patent: Nov. 13, 2018

(54) CONTROLLED LAMP DEVICE

(71) Applicant: Steinel GmbH, Herzebrock (DE)

(72) Inventor: Thomas Moeller, Herford (DE)

(73) Assignee: Steinel GmbH, Herzebrock (DE)

( * ) Notice: Subject to any disclaimer, the term of this patent is extended or adjusted under 35 U.S.C. 154(b) by 0 days.

(21) Appl. No.: 15/129,012

(22) PCT Filed: Mar. 4, 2015

(86) PCT No.: PCT/EP2015/054495
§ 371 (c)(1),
(2) Date: Mar. 6, 2017

(87) PCT Pub. No.: WO2015/144405
PCT Pub. Date: Oct. 1, 2015

(65) Prior Publication Data
US 2017/0171943 A1 Jun. 15, 2017

(30) Foreign Application Priority Data
Mar. 26, 2014 (DE) .................. 10 2014 104 174

(51) Int. Cl.
*H05B 33/08* (2006.01)
*H05B 37/02* (2006.01)
(Continued)

(52) U.S. Cl.
CPC .......... *H05B 37/0227* (2013.01); *F21S 6/003* (2013.01)

(58) Field of Classification Search
None
See application file for complete search history.

(56) References Cited

U.S. PATENT DOCUMENTS

2007/0258243 A1* 11/2007 Segall ................. H05B 37/02
362/276
2009/0195166 A1* 8/2009 Chen ................. H05B 33/0863
315/158
(Continued)

FOREIGN PATENT DOCUMENTS

CN          103179359 A      6/2013
DE           10251133 B3      7/2004
WO        2010146446 A1     12/2010

OTHER PUBLICATIONS

International search report for application No. PCT/EP2015/054495 dated Aug. 24, 2015.

*Primary Examiner* — Dedei K Hammond
(74) *Attorney, Agent, or Firm* — Bachman & LaPointe, PC

(57) ABSTRACT

A controlled lamp device (1), comprising: a lamp housing (2) with a light exit opening (3), a sensor unit (4) for detecting a contactless manual intervention (15, 16-1, 16-2, 17) of an operator of the lamp device in an intervention region (5, 5-1, 5-2), and an evaluation and control device (6) for evaluating the intervention of the operator detected by the sensor unit and for influencing a control parameter for the operation of the lamp device depending on a result of the evaluation, wherein the sensor unit (4) is provided in and/or on the light housing (2) laterally adjacent to the light exit opening (3), and the evaluation and control device (6) is designed such that it only influences the control parameter if the evaluation carried out by the evaluation and control device (6) shows that a predefined path in an intervention region has been covered in a gesture-like manner during the intervention of the operator.

12 Claims, 2 Drawing Sheets

(51) Int. Cl.
*F21V 23/04* (2006.01)
*F21S 6/00* (2006.01)

(56) References Cited

U.S. PATENT DOCUMENTS

2010/0244752 A1* 9/2010 Van Endert ............ H03K 17/94
315/363
2013/0249410 A1* 9/2013 Thompson ......... H05B 37/0227
315/158
2015/0181679 A1* 6/2015 Liao ................... H05B 37/0227
315/291

* cited by examiner

CONTROLLED LAMP DEVICE

BACKGROUND OF THE INVENTION

The present invention relates to a controlled lamp device comprising a light housing having a light exit opening, a sensor unit for detecting a contactless manual intervention by an operator of the lamp device in an intervention region, and an evaluation and control device for evaluating the intervention of the operator that is detected by the sensor unit and for influencing a control parameter for the operation of the lamp device depending on a result of the evaluation.

Lamp devices in general are known from the prior art.

Lamp devices, in particular desk lamps and table lamps, are normally switched on or off by way of a switch that is manually operated by an operator. This manual activation of a switch represents not only a basic hygiene problem but also a potential hazard. Common lamp devices produce a high power loss in the form of heat and some of their surfaces heat up in such a way that an operator, who reaches out near to the switch to be operated and touches one of the hot surfaces, may suffer scalding. In the case of lamps with metal parts which can be touched by an operator, there is also a risk that in the event of a defect in the lamp device, the operator may suffer an electrical shock. Added to this is the fact that the mechanical components of a switch that is to be operated manually by an operator are prone to error and are subject to mechanical ageing processes.

To overcome these problems, different approaches to the contactless de-/activation of a lamp device are known from the prior art. In the case of passive infrared detector-controlled lamp devices, the heat emission of an object moving in a detection region of the passive infrared detector is used. A differential amplifier is used to detect a temporal motion of a heat-radiating object.

Further options include, for example, a high-frequency Doppler radar-based solution, which detects a frequency shift, caused by a movement of a detection object, of a frequency beam which is emitted for detection purposes.

The contactlessly controlled lamp devices in the prior art technology cited above are all liable to problems. The passive infrared detection suffers from a strong dependence of the detection properties on the direction of motion of a heat-radiating object relative to the measuring direction of the sensor. While changes in temperature caused by objects moving laterally to the passive infrared sensor can be readily detected as heat radiation scattered by a lens structure onto two heat sensors, movements of a thermally radiating object moving directly towards the sensor are very difficult to detect. Moreover, the accuracy of passive infrared detection is strongly dependent on the spatial size of the heat-radiating object and its temperature relative to the ambient temperature. The calibration of a passive infrared detector can usually only be effected by setting a sensitivity threshold. In the case of the high-frequency Doppler radar-based solution the object to be detected must be moving with a minimum speed. Consequently, a slow movement below this minimum speed with the high-frequency Doppler frequency radar-based solution cannot be detected in principle.

The above listed lamp devices of generic kind enable a contactless and motion-initiated de-/activation of a respective lamp device. These known controlled lamp devices suffer from the above-mentioned disadvantages however, in particular the direction dependency of the detection sensitivity, the inaccuracy of the movement or gesture detection and/or the necessary minimum speed of the movement being executed.

SUMMARY OF THE INVENTION

The object of the present invention is therefore to provide a controlled lamp device with a more precise control of the de-/activation, or an improved detection of the movement(s) of an object used to provide the control function.

The object of the present invention is achieved by means of a controlled lamp device of generic kind with the characterizing features as disclosed herein. Additional features of other advantageous embodiments arise as disclosed herein.

The controlled lamp device according to the invention comprises a light housing having a light exit opening, a sensor unit for detecting a contactless manual intervention by an operator of the lamp device in an intervention region, or detection region, and an evaluation and control device for evaluating the intervention of the operator that is detected by the sensor unit and for influencing a control parameter for the operation of the lamp device depending on a result of the evaluation. In accordance with the invention, the sensor unit is provided in and/or on the light housing laterally adjacent to the light exit opening. In addition, the evaluation and control device is designed such that it preferably only influences the control parameter if the evaluation carried out by the evaluation and control device shows that a predefined path in an intervention region has been covered in a gesture-like manner during the intervention of the operator.

While in the case of the generic type of lamp devices from the prior art only the motion per se is detected, i.e. whether a movement or, by contrast, a stationary state (no movement) is present, the present invention is based on the principle that the lamp device according to the invention is used to evaluate a movement of an object, represented in the form of a gesture-like motion by a hand or a hand with part of an arm, with reference to a predefined path in an intervention region or detection area. The notion of the predefined path in the context of the present disclosure designates the section or sections within the intervention region as a predefined spatial sub-region of the intervention region, in which the gesture executed by the operator of the lamp device, i.e. a pivoting or movement of a hand within and/or through the intervention area, must be located in order for the evaluation and control device to influence the control parameter of the lamp device. The notion of the predefined path also includes consideration of the temporal aspect of the gesture-like movement carried out, by a temporal bandwidth of the gesture(s) carried out or the length of a time interval from a start of a gesture-like intervention to an end of the gesture-like intervention being taken into account in the evaluation of the gesture-like movement by the lamp device according to the invention. The term predefined path can also be understood in the sense of a path of a specified minimum length. Another difference from the prior art which emerges here is that it is not only the alternative presence of a movement or otherwise which is detected, but the spatial extension of the intervention performed by the operator in the intervention area, being the detection region of the sensor unit, is also taken into account for influencing a control parameter of the lamp device according to the invention.

In accordance with the invention, the sensor unit is provided in and/or on the light housing laterally adjacent to the light exit opening.

This enables any light radiated by the light exit opening in an illumination region to overlap with the intervention region. Thus, the illumination region which is inherently free is used in a practical way as a detection region or intervention region for the gesture-based control of the lamp device. In addition, in the light-emitting state of the lamp device the operator can very easily identify the intervention area.

To provide further clarification of what is understood within the context of the invention under the notion of a predefined path covered by the operator in a gesture-like manner in the intervention region during an intervention, some exemplary embodiments are described in the following.

In one embodiment according to the invention, the predefined path is defined such that this has been covered if the intervention region has been fully traversed by the contactless manual intervention of the operator in one of its dimensional directions, e.g. horizontally, which in particular in the case of a table lamp device allows an appropriate use of the available space. This corresponds to the case in which an operator of, for example, the table lamp device makes an intervention in the intervention region in such a way that the at least one hand of the operator executes a wipe-like movement from left to right or vice versa, in the sense of a gesture made by the hand in pushing away or wiping away something from one side to another. If an evaluation of the gesture-like intervention in the intervention region detected by the sensor unit carried out by the evaluation and control device shows that the predefined path has been covered by such a wiping gesture in the intervention region, then the evaluation and control device influences the control parameter for the operation of the lamp device in such a way that, for example, the lamp device is transferred from a light-emitting operating state into a non-light-emitting operating state, or vice versa.

In an extension of this embodiment according to the invention, during the evaluation of the gesture-like intervention the evaluation and control device also takes into account its direction. If the result of the evaluation carried out by the evaluation and control device shows that the predefined path was covered in the form of a wiping gesture like that described above, horizontally from left to right in the intervention region, for example, then the lamp device is transferred, for example, into a light-emitting operating state, while in the event that the predefined path was covered in the form of a wiping gesture like that described above, horizontally from right to left in the intervention region, then the lamp device is transferred into a non-light-emitting operating state. The evaluation and control device can thus be designed in such a way that during the evaluation of whether the predefined path has been covered or not, it not only takes the distance of the path travelled in the intervention region into account, but also its orientation from a starting position to an end position of the path travelled, and performs the control action in accordance with the result of the evaluation.

A further embodiment according to the invention is additionally configured in such a way that the evaluation and control device is designed to evaluate the intervention of the operator with respect to a predefined plurality of predefined paths, to identify the predefined path associated with the intervention of the operator from the predefined plurality of predefined paths and to influence the control parameter depending on the detected predefined path.

In this embodiment according to the invention, the evaluation and control device is configured in such a way that, from a predefined plurality of predefined paths it can assign a path covered during a manual intervention by the operator in the intervention region to a predefined path from the predefined plurality of predefined paths, i.e. it can detect this. In the event of a detection of a predefined path, the evaluation and control device then performs an influencing action on the control parameter depending on the predefined path detected. In one embodiment according to the invention the predefined plurality of predefined paths comprises, for example, the wiping gesture horizontally from left to right in the intervention region, as described above, as a first predefined path and a gesture-like coverage of a path in an upwards direction; i.e. vertically in the intervention region, as a second predefined path.

If the evaluation and control device in accordance with this embodiment evaluates a gesture-like intervention as the wiping gesture from left to right and therefore assigns the intervention of the operator to the first predefined path from the predefined plurality of predefined paths, or detects this as such, then the evaluation and control device influences the control parameter for the operation of the lamp device in accordance with the influencing action provided for the first detected predefined path, so that the lamp device is transferred, for example, into a light-emitting operating state. In the case of a vertically directed intervention of the operator in the intervention region, the evaluation and control device, on the other hand, detects that this intervention is associated with the second predefined path and mutatis mutandis influences the control parameter in a different way than is the case for the detection of the first predefined path. For example, in the event that the evaluation and control device detects that the gesture-like intervention is associated with the second predefined path, it carries out a change in the brightness of the light emitted by the lamp device.

As a further extension of this embodiment, the predefined plurality of predefined paths known to the evaluation and control device is defined in such a way that different predefined paths are provided or defined for gesture-like interventions in the same direction but with different path lengths travelled. In this case the evaluation and control device can then change the control parameter with respect to the same property but by a different amount, depending on the path travelled during the gesture-like intervention, from the subset of the predefined paths that relate to a gesture-like intervention in the same direction but with a different path length. Thus, for example, an intervention performed vertically in the intervention region over a short distance can cause a slight increase in the brightness of the light emitted by the lamp device, while an intervention performed vertically in the intervention region over a long distance is assigned by the evaluation and control device to another predefined path, so that, for example, the brightness of the light radiated by the lamp device is greatly increased.

In a further embodiment according to the invention, the evaluation and control device is additionally designed in such a way that it influences the control parameter when the evaluation carried out by the evaluation and control device shows that during the intervention of the operator, the predefined path in the intervention region has been covered in a gesture-like manner within a predefined intervention duration and/or with a predefined velocity characteristic and/or with a predefined direction characteristic.

In this embodiment, the evaluation and control device assigns the gesture-like intervention in the intervention region to a predefined path only when this intervention has been covered within a predefined intervention period or with a predefined velocity characteristic, for example with a minimum speed or maximum speed, and/or with a predefined direction characteristic, for example only in an upwards direction. In addition to the previously described embodiments, a lamp device in accordance with this embodiment only detects an intervention carried out as a wiping gesture from left to right across the entire intervention region as being associated with or assigned to a predefined path if this intervention has been completed within a predefined intervention duration, for example, two seconds, assigned to this predefined path, and then transfers the lamp device into a light-emitting state. If, on the other hand, this gesture-like intervention had been slower, i.e. executed with a longer intervention duration than the predefined intervention time for the predefined path which is examined or evaluated, then in combination with the previously described embodiment this more slowly executed gesture can be assigned to a different influencing action of the control parameter, thus to another predefined path, so that, for example, the evaluation and control device modifies a colour value of the light emitted by the lamp device or transfers the lamp device into a configuration mode (described later).

In the case of an embodiment in which the evaluation and control device evaluates the gesture-like intervention only as a coverage of a predefined path if the latter has been covered with a predefined speed characteristic, then different configurations are possible. In a simple configuration, equivalent to the predefined intervention time period, a predefined minimum velocity or maximum velocity is specified, which has or have to be observed to ensure that the evaluation and control device evaluates a gesture-like intervention as a coverage of this predefined path.

In a further development of this embodiment and with consideration of the predefined speed characteristic, for a given predefined path different speed intervals can be provided for portions of this path or for the path travelled. Thus a predefined path with a predefined speed characteristic can be present, for example, when in a first section a path has been covered at any speed, or in a second section has been covered at a very low speed or even none at all, i.e. at a standstill, and if in a third section it has been covered at a minimum speed.

In a further configuration a direction characteristic can be assigned to a predefined path so that the evaluation and control device only detects a distance covered by the operator in the intervention region during a gesture-like intervention as a predefined path, or assigns this path covered to the predefined path, when the gesture-like movement has been carried out in a certain direction or over the distance travelled with changing predefined directions, for example in a first section from left to right parallel to a surface of the light exit opening and in a second section from bottom to top, perpendicular to the light exit opening. To ensure that the evaluation and control device in accordance with this embodiment detects that a predefined path in the intervention region has been covered in a gesture-like manner during the gesture-like intervention, this path can be assigned a combination of a predefined intervention duration, a predefined speed characteristic and a predefined direction characteristic, specified with arbitrary complexity.

By taking into account the different predefined characteristics with regard to the evaluation of the existence of a predefined path, not only can a precise contactless control of the lamp device itself be implemented, but also a multifunctional control of the lamp device.

In a further embodiment according to the invention, the evaluation and control device is designed so that it influences the control parameter depending on a direction of the predefined path covered during the intervention of the operator relative to a reference direction, which is a normal to the light exit opening or a normal to a mounting surface on the base of the lamp device (implemented, for example, by a potentiometer housed in an adjustable joint of the lamp housing, by means of which an adjustment angle of the light exit opening relative to the mounting surface on the base of the lamp device can be detected), and/or, preferably proportionally, depending on a length of the predefined path covered during the intervention of the operator.

This enables a simplified and more accurate gesture-controlled operation of the lamp device, because the operator can better identify axes along which the gesture-like intervention should be carried out to achieve a desired influencing of the control parameter, by reference to an inclination of the light-emitting surface or the mounting surface.

In a further embodiment according to the invention, the evaluation and control device is designed in such a way that it influences the control parameter while the operator is covering the predefined path in a gesture-like manner in the intervention region.

In this embodiment, the evaluation carried out by the evaluation and control device shows first of all that the predefined path, or a predefined path from the predefined plurality of predefined paths, has been covered in a gesture-like manner in the intervention area during the intervention of the operator. Thereafter, the evaluation and control unit influences the control parameter depending on the predefined path detected and modifies the influence on the control parameter in accordance with the continued intervention of the operator in the intervention area.

For example, according to this embodiment the evaluation and control device evaluates a distance covered in the intervention region firstly as a coverage of a predefined path, to which an influencing of the control parameter to increase the brightness of the light emitted by the lamp device is assigned. If, following the evaluation that a certain path has been covered in a gesture-like manner during the intervention of the operator carried out thus far, the operator then continues the gesture-like intervention, then the evaluation and control device accordingly continues to influence the control parameter until the evaluation of the intervention of the operator detected by the sensor unit identifies a termination of the intervention. For example, the evaluation carried out by the evaluation and control device shows that a predefined path has been covered, which corresponds to an influencing of the control parameter in such a way that the lamp device is transferred into a state in which it emits red light (alternative example: light with a certain brightness). If after the start of the emission of this light the operator then continues to carry out a gesture-like intervention in the intervention region, the colour value (alternative example: the brightness) of the light emitted by the lamp device is changed until the operator terminates the gesture-like intervention.

This embodiment enables an exact setting of a mode of operation of the lamp device desired by the operator and also realizes a contactless setting of this operating mode, as is otherwise known only from actuators or sliders which require contact to operate.

In accordance with a further embodiment according to the invention, the evaluation and control device contains an activation unit, which is designed to detect whether a predefined activation path has been covered during the intervention in the intervention region, and which in the event that a predefined activation path has been detected by the activation unit, enables the evaluation and control unit, during an activation interval which is temporally predefined or defined by an intervention of the operator directly following the activation path in the intervention region, to evaluate a contactless manual intervention in the intervention region detected by the sensor unit in the activation interval and to influence the control parameter. The predefined activation path corresponds almost to a first predefined path, the coverage of which in the intervention region enables the detection of a path subsequently travelled in the intervention region and the evaluation by the evaluation and control unit of this second path covered in a gesture-like manner with respect to a second predefined path.

The predefined activation path in this case corresponds, for example, to a gesture-like intervention in the intervention region in the form of a doubly executed wiping gesture, i.e. for example from left to right and then from right to left, within a short period of time, of for example one second. After the activation unit has detected that the predefined activation path has been covered with the double wiping gesture in the intervention region, the activation unit preferably also acts as an acknowledgement unit and accordingly acknowledges the completed activation to the operator, for example by transferring the lamp device into a light-emitting state, which enables the operator very easily to recognize that the lamp device is activated and can process a further gesture in the intervention region. The operator can then, either in a temporally predetermined or limited manner or for the duration of an intervention performed by the operator in the intervention region, perform a gesture-controlled intervention in the intervention region in order to control the lamp device in a gesture-like manner. For example, during the activation interval and using a gesture-like intervention, as previously explained with regard to other design forms given above, the operator can change or control the brightness or the colour of the light emitted by the lamp device.

This embodiment provides a particularly reliable and convenient means for controlling and adjusting the lamp device for the operator. Because an activation path must first be covered or entered in a gesture-like manner in the intervention region, the control parameter cannot be changed by a random movement of the operator in the vicinity of the lamp device.

In a further embodiment according to the invention the evaluation and control device also contains a storage device for storing a current control parameter for a future operation, in particular a future power-on procedure, of the lamp device in response to a received storage signal. The storage signal alerts the storage device in the evaluation and control device that a current control parameter is to be stored for a future operation. For this purpose the evaluation and control device is also designed to detect a storage requirement, by being able to detect or evaluate whether during the gesture-like intervention this gesture-like intervention was stopped at a position in the intervention region for a predefined dwell time, and/or whether a predefined storage path has been covered in the intervention region, and is also designed to generate the storage signal in the event that a storage requirement is detected or evaluated.

In accordance with this embodiment, by means of a gesture-like intervention in the intervention region an operator can store the value of the current control parameter if desired, for example, the brightness or the colour value of the light currently being emitted by the lamp device, in the lamp device. The evaluation and control unit then detects the existence of a storage requirement based on the fact that the operator stops a gesture-like intervention for a predefined dwell period, for example three seconds, at a position in the intervention region, i.e. the hand or the arm section remains at rest in the intervention region during this dwell period, or based on the fact that a predefined storage path has been covered in the intervention region, which is preferably defined by a rapid withdrawal of the hand or the arm section out of the intervention area.

Alternatively or optionally, the evaluation and control device can also detect the storage requirement if, during a gesture-like intervention, this is first stopped in the intervention region for a predefined dwell period, and then the previously mentioned predefined storage path is covered by the operator in the intervention region. The predefined storage path is in this case preferably assigned a predefined speed characteristic, so that the evaluation and control device evaluates or detects the path covered in the intervention region as the predefined storage level only if the operator removes their hand or arm section from the intervention area with a high minimum speed.

This contactless realization of the initiation of a storage event is particularly advantageous because the action to be carried out by the operator for signalling the storage requirement follows on very readily from a gesture-like adjustment of the brightness or colour value of the light emitted by the lamp device, which is performed by the operator in the intervention region.

In accordance with a further embodiment according to the invention, the evaluation and control device also contains a learning and configuration unit which is designed for detecting and recording, in a training operating mode different from a normal control mode of the lamp device, reference positions and/or predefined paths which an operator defines or covers in the intervention region, and for configuring the evaluation and control device in accordance with the reference positions detected and recorded and/or with the predefined paths.

In this arrangement the lamp device is designed in such a way that the training operating mode is launched on an initial installation of the lamp device after delivery, after restoration of the power supply to the lamp device following its disconnection from the power supply, or by the operator covering a predefined training path in the intervention region, which is defined for example by means of a wiping gesture performed by the operator in the intervention region from left to right and from right to left three times within a short period of time, for example, three seconds. During the training operating mode, by emission of light, for example in a clocked manner, with varying brightness and/or with a varying colour value, the lamp device signals which intervention the operator is to perform in the intervention region.

For example, the lamp device emits light with a rapid flashing pattern so as to signal to the operator that they are to position their hand at a specified reference position, for example vertically below the light exit opening, or signals to the operator that they should execute a wiping gesture in the intervention region, by the lamp device continuously varying the brightness of the light that it emits.

This realization of a configuration of the controlled lamp device enables a universal operability and adaptation to a wide range of application scenarios.

In accordance with a further embodiment according to the invention, for the operation of the lamp device the control parameter influences at least one operating state of the lamp device, which is selected from the group consisting of a lamp activation, i.e. switching the light emitted by the lamp device on or off, a light intensity, i.e. a brightness or dimming level of the light emitted by the lamp device, and a colour value of the light emitted by the lamp device, and combinations of these.

In accordance with this embodiment, the lamp device can be switched on, for example, by a wiping gesture from left to right and switched off by a wiping gesture executed from right to left in the intervention region. In the light-emitting condition of the lamp device the light intensity can be increased or decreased by a gesture performed by the operator in the intervention region vertically, i.e. from bottom to top or from top to bottom. The colour value can then be changed accordingly, for example, by way of a gesture-like movement in a direction perpendicular to one of the two directions named above.

According to one embodiment according to the invention, the sensor unit contains a sensor of a type from a group consisting of a passive infrared sensor, image acquisition sensor and high-frequency radar sensor, or a combination of sensors of the same type or different types from the group arranged in one or two dimensions, in order to detect the contactless manual intervention of the operator in the intervention region. In a particularly advantageous embodiment, in particular a plurality of passive infrared sensors are arranged along a straight line or on a surface.

In accordance with a further embodiment according to the invention, the light housing of the lamp device, which is preferably designed as a table lamp, comprises a stand on its base and spaced apart from the light exit opening, for mounting the lamp device on a mounting surface, and the intervention region extends from a surface of the light exit opening as far as the mounting surface and preferably overlaps with the illumination region and/or is located therein.

Particularly for a table lamp device of this device, the illumination region which is thereby irradiated with light can be used to advantage as an intervention region for a gesture-like intervention performed by the operator.

The functionality of the sensor unit and in particular of the evaluation and control device can be partly or completely implemented by means of software, hardware, or a combination of software and hardware.

Further advantageous embodiments according to the invention arise from the combination of at least two of the embodiments according to the invention given previously or hereafter, provided such a combination is not obviously contradictory.

BRIEF DESCRIPTION OF THE DRAWINGS

Hereafter, exemplary embodiments of the invention will be described by reference to the attached figures, in which.

In these figures, identical or equivalent elements are provided with the same reference numeral.

DETAILED DESCRIPTION

Figure 1:
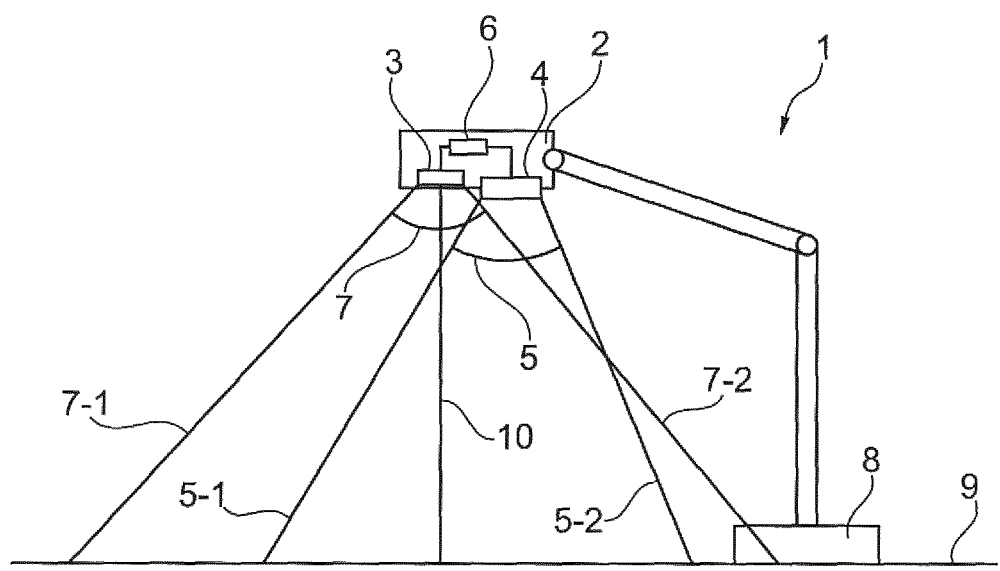
FIG. 1 shows a side view of a lighting device in accordance with one embodiment of the invention.

FIG. 1 shows a lamp device in accordance with one embodiment of the invention. The lamp device 1 in the embodiment shown is designed as a table lamp, and has a light housing 2 and a stand 8. The stand 8 is used, as shown in FIG. 1, for mounting the lamp device on a mounting surface 9.

The light exit opening 3, the sensor unit 4 and the evaluation and control device 6 are accommodated in the light housing 2. The evaluation and control device 6 is electrically connected to the sensor unit 4 and is supplied by the latter with information for the evaluation of a gesture-like intervention. The evaluation and control device 6 is also electrically connected to the lamp (not explicitly shown in FIG. 1, but assumed to be housed in the light exit opening 3) of the lamp device 1 and influences the latter's activation or operating mode.

The light exit opening 3 is arranged in or on the light housing 2 and designed in such a way that light that can be emitted by the lamp housed in the lamp device 1 through the light exit opening 3 onto the mounting surface 9 within an illumination region 7, which is defined by imaginary boundary lines 7-1 and 7-2 shown in FIG. 1 with the normal to the light exit opening 10 bisecting the angle between them, and extends from the light exit opening 3 down to the mounting surface 9.

The sensor unit 4 is provided in and/or on the light housing 2 laterally adjacent to the light exit opening 3 and is designed as a sensor unit for detecting a contactless intervention of an operator of the lamp device 1 in the intervention region 5, which is defined by imaginary boundary lines 5-1 and 5-2 shown in FIG. 1 and extends from the sensor unit 4 down to the mounting surface 9. The intervention region, or detection region 5, spatially overlaps with the illumination region 7.

Figure 2:
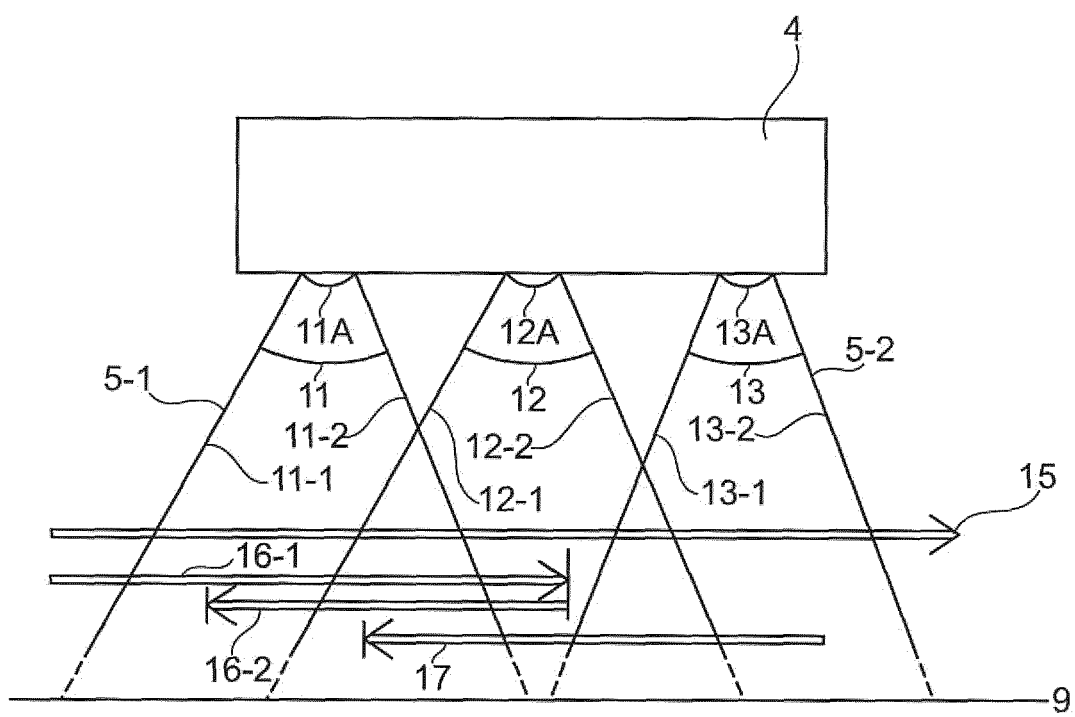
FIG. 2 shows a sensor unit of the embodiment of the lamp device according to the invention shown in FIG. 1 and its associated intervention region.

FIG. 2 shows a sensor unit 4 which is housed in the lamp device shown in FIG. 1. FIG. 2 further shows a view of the intervention area 5, which is not true-to-scale, defined by the imaginary boundary lines 5-1 and 5-2 and also bounded by the mounting surface 9.

The sensor unit 4 shown in FIG. 2 comprises three passive infrared detection sensors 11A, 12A and 13A with their respective detection regions 11, 12 and 13, not shown true-to-scale, which together form the intervention region 5 of the sensor unit 4, defined by the imaginary boundary lines 5-1 and 5-2 shown in FIG. 1 and FIG. 2. The sensors 11A, 12A and 13A are arranged along an arrangement axis. The detection region 11 of the passive infrared detection sensor 11A extends within the imaginary boundary lines 11-1 and 11-2 shown in FIG. 2, from the passive infrared detection sensor 11A to the mounting surface 9. The detection regions 12 and 13 of the other two passive infrared detection sensors 12A and 13A extend correspondingly within the imaginary boundary lines 12-1 and 12-2, or 13-1 and 13-2, shown in FIG. 2, from the respective sensor 12A or 13A to the mounting surface 9.

The sensor unit 4 shown in FIG. 2, due to the three sensors 11A, 12A and 13A arranged along the horizontal arrangement axis, is particularly well suited for the detection of gesture-like interventions or gestures of the operator that are executed along a line parallel to this arrangement axis.

The horizontally extending arrows 15, 16-1, 16-2 and 17 shown in FIG. 2 are intended to illustrate gesture-like interventions of an operator, i.e. a pivoting or movement of a hand or a section of an arm, in the intervention region 5 of the sensor unit 4. The arrow 15 extending from left to right in FIG. 2 represents a gesture-like intervention of the operator moving their hand from left to right and thus parallel to the arrangement axis of the sensors. Initially, the hand being moved in a gesture-like manner is located outside the intervention region 5 (and thus to the left of the boundary line 5-1 of FIG. 2), then the hand is moved from left to right and in doing so passes through the intervention region 5 and therefore also all detection regions 11A, 12A and 13A, until the hand movement finally ends outside of the intervention region (and thus to the right of the boundary line 5-2 of FIG. 2). The arrow 15 represents a rapidly executed wiping movement from left to right through the entire intervention region 5.

During this rapid wiping movement of a hand in accordance with the arrow 15 the individual detection regions 11, 12 and 13 of the sensors 11A, 12A and 13A are passed through consecutively and in a partially overlapping manner, and accordingly the sensors 11A, 12A and 13A detect an entry and exit of the moving hand into the respective detection regions 11, 12 and 13 at different entry and exit times. The sensor unit 4 communicates these detected entry times te_x and exit times tv_x (where x stands for the respective sensor) to the evaluation and control unit 6, which can evaluate the gesture-like motion of the hand on the basis of these reported entry and exit times. Based on the example of arrow 15 in FIG. 2, the evaluation and control device 6 determines that the motion took place continuously from left to right (because te_11A<te_12A<te_13A), and on the basis of the differential tv_13A-te_11A between the times of entry into the intervention region 5 and the departure from it, evaluates the speed of the hand movement performed. If the differential tv_13A-te_11A (or the absolute magnitude thereof) falls below a certain predefined level, the evaluation and control unit 6 then determines that during the gesture-like intervention in accordance with arrow 15 a predefined path has been covered, namely that a rapid wiping gesture executed from left to right has occurred. As a consequence of this evaluation result, the evaluation and control device 6 then activates the lamp housed in the lamp device 1, so that the lamp device emits light. The wiping gesture carried out horizontally from left to right through the intervention region 5 at high speed thus causes the evaluation and control device 6 to activate, or switch on, the lamp of the lamp device. On the other hand, the lamp of the lamp device is deactivated or switched off if the evaluation by the evaluation and control device 6 shows that a fast wiping gesture from right to left through the intervention region 5, specifically through the sensing ranges 13A, 12A and 11A in sequence, has occurred.

The information determined in the evaluation and control device 6, or accessible to it, about the predefined plurality of predefined paths provides further evaluation options for the gesture-like interventions made or predefined paths covered, which are explained hereafter by reference to the other arrows shown in FIG. 2.

The arrows 16-1 and 16-2 in FIG. 2 represent a slow gesture, firstly from left to right, then from right to left, performed by the operator in the intervention region 5. The evaluation of te_11A, te_12A therefore shows that gesture has been performed from left to right at a slower speed. Therefore the evaluation and control device 6 increases the brightness of the light emitted by the lamp device 1. At the transition from the arrow 16-1 to arrow 16-2 the operator changes the direction of the gesture, which now runs from right to left in the intervention region. The evaluation and control device 6 detects this change of direction by the fact that the sensor 13A cannot detect the gesture-like intervention of the operator even after a certain period of time has elapsed after detection by the sensor 12A, but rather the sensor 11A together with the sensor 12A detect the gesture-like intervention which is continued after the change of direction. As a result of this evaluation, the evaluation and control device 6 then reduces the brightness of the light emitted by the lamp device 1.

The gesture-like intervention represented by the arrow 17 in FIG. 2 takes place in the same way as the intervention shown by the arrows 16-1 and 16-2 with slower speed but in the reverse direction, namely from right to left. The evaluation and control device 6 evaluates this in the sense of a colour change gesture, and accordingly changes the colour value of the light emitted by the lamp device 1 until the gesture-like intervention executed at a slow speed ends.

The current values for the control parameter, which have been set as described above by the gesture-like movements according to the arrows 16-1, 16-2 and 17 in FIG. 2 under the influence of the evaluation and control device 6, can be permanently stored in a storage device of the evaluation and control device 6 for subsequent switching-on operations of the lamp device 1, by the operator immediately after one of the movements previously described with reference to arrows 16-1, 16-2 or 17, executed at slow speed, then executing a gesture-like motion from left to right or vice versa at high speed in the intervention region, which the evaluation and control device 6 evaluates as a coverage of the predefined stored path with a predefined stored speed characteristic.

In addition to the three passive infrared sensors shown in FIG. 2, in a further embodiment a further two passive infrared sensors can be provided in the sensor unit on an axis which intersects the arrangement axis of the sensors 11A, 12A and 13A perpendicularly at the position of the sensor 12A, so that the positions of the five sensors form the shape of a "+" sign in a plane. This sensor arrangement can be used to detect and evaluate two-dimensionally gesture-like movements executed in a plane parallel to the mounting surface 9.

Alternatively, the sensor unit 4 can have only one passive infrared sensor with a suitably designed lens structure, mounted upstream.

In a further embodiment the sensor unit 4 is provided with an image acquisition sensor in the form of a camera, and the evaluation and control device 6 evaluates the path which was covered in a gesture-like manner in the intervention region 5 using image processing of the images acquired by the sensor unit 4, or differences between the images.

In a still further embodiment, the sensor unit 4 is provided with a high-frequency radar sensor that supplies the evaluation and control device 6 with information, so that this can identify the position of the hand of an operator moved in a gesture-like manner in the intervention region 5 in coordinate form (for example, polar coordinates), and use this for evaluating the existence of a predefined path. For a corresponding implementation, reference is made to the technical teaching which can be obtained from the European patent application EP 2651 194 by the applicant, and which, in particular with regard to technical details of a constructional implementation of the sensor functionality, including determination of distances, direction of motion and speed of motion of a detection object, is to be incorporated into this disclosure as being integral to the invention.

The invention claimed is:
1. A controlled lamp device (1), comprising:
a light housing (2) with a light exit opening (3),
a sensor unit (4) for detecting a contactless manual intervention (15, 16-1, 16-2, 17) of an operator of the lamp device in an intervention region (5, 5-1, 5-2), and
an evaluation and control device (6) for evaluating the intervention of the operator detected by the sensor unit and for influencing a control parameter for the operation of the lamp device depending on a result of the evaluation, wherein
the sensor unit (4) is provided in and/or on the light housing (2) laterally adjacent to the light exit opening (3),
the evaluation and control device (6) is designed such that it only influences the control parameter if the evaluation carried out by the evaluation and control device (6) shows that a predefined path in an intervention region has been covered in a gesture-like manner during the intervention of the operator with a predefined velocity characteristic, and the light housing (2) of the lamp device (1) comprises on its base and spaced apart from the light exit opening (3), a stand (8) for mounting the lamp device on a mounting surface (9), and wherein the intervention region (5, 5-1, 5-2) extends from a surface of the light exit opening (3) as far as the mounting surface (9) and overlaps with an illumination region (7, 7-1, 7-2) that can be irradiated with light from the light exit opening, and/or is located therein.

2. The controlled lamp device according to claim 1, wherein the evaluation and control device (6) is designed to evaluate the intervention of the operator with respect to a predefined plurality of predefined paths, to identify the predefined path associated with the intervention of the operator from the predefined plurality of predefined paths, and to influence the control parameter depending on the predefined path detected.

3. The controlled lamp device according to claim 1, wherein the evaluation and control device is designed such that it influences the control parameter depending on a direction of the predefined path covered during the intervention of the operator relative to a reference direction (9, 10) and/or, as a function of a length of the predefined path covered during the intervention of the operator.

4. The controlled lamp device according to claim 1, wherein the evaluation and control device (6) is designed such that it influences the control parameter while the operator is covering the predefined path in the intervention region in a gesture-like manner.

5. The controlled lamp device according to claim 1, wherein the evaluation and control device (6) contains an activation unit, which is designed to detect whether a predefined activation path has been covered during the intervention in the intervention region, and which in the event that a predefined activation path has been detected, enables the evaluation and control unit, during an activation interval which is temporally predefined or defined by an intervention of the operator immediately following the activation path in the intervention region, to evaluate a contactless manual intervention in the intervention region detected by the sensor unit in the activation interval and to influence the control parameter.

6. The controlled lamp device according to claim 1, wherein the evaluation and control device (6) further includes a storage device for storing a current control parameter for a future operation of the lamp device in the event of a future switching-on operation, in response to a storage signal, and wherein the evaluation and control device is also designed to detect a storage requirement on the basis of whether, during the gesture-like intervention this was stopped for a predefined dwell time at a position in the intervention region, and/or whether a predefined storage path in the intervention region has been covered with a predefined stored speed characteristic, and to generate the storage signal in the event of a storage requirement being detected.

7. The controlled lamp device according to claim 1, wherein the evaluation and control device additionally contains a learning and configuration unit, which is designed for the detection and recording, in a training operating mode, of reference positions and/or predefined paths which an operator defines or covers in the intervention region, and for configuring the evaluation and control device in accordance with the reference positions detected and recorded and/or with the predefined paths.

8. The controlled lamp device according to claim 1, wherein the control parameter for the operation of the lamp device influences at least one operating stateof the lamp device, which is selected from the group consisting of a lamp activation, a light intensity of the light emitted lamp device and a colour value of the light emitted by the lamp device, and combinations of these.

9. The controlled lamp device according to claim 1, wherein the sensor unit (4) comprises a sensor (11A, 11B, 11C) of a type from a group consisting of a passive infrared sensor, image acquisition sensor and high-frequency radar sensor or a combination of sensors of the same type or different types from the group arranged in one or two dimensions, in order to detect the contactless manual intervention of the operator in the intervention region.

10. The controlled lamp device according to claim 1, wherein the evaluation and control device is designed such that it influences the control parameter depending on a direction of the predefined path covered during the intervention of the operator relative to a reference direction (9, 10) and/or, proportionally, as a function of a length of the predefined path covered during the intervention of the operator.

11. The controlled lamp device according to claim 1, wherein the lamp device is designed as a table lamp (1).

12. A controlled lamp device (1), comprising:
a light housing (2) with a light exit opening (3),
a sensor unit (4) for detecting a contactless manual intervention (15, 16-1, 16-2, 17) of an operator of the lamp device in an intervention region (5, 5-1, 5-2), and
an evaluation and control device (6) for evaluating the intervention of the operator detected by the sensor unit and for influencing a control parameter for the operation of the lamp device depending on a result of the evaluation,
wherein
the sensor unit (4) is provided in and/or on the light housing (2) laterally adjacent to the light exit opening (3),
the evaluation and control device (6) is designed such that it only influences the control parameter if the evaluation carried out by the evaluation and control device (6) shows that a predefined path in an intervention region has been covered in a gesture-like manner during the intervention of the operator with a predefined velocity characteristic, and
the evaluation and control device (6) further includes a storage device for storing a current control parameter for a future operation of the lamp device in the event of a future switching-on operation, in response to a storage signal, and wherein the evaluation and control device is also designed to detect a storage requirement on the basis of whether, during the gesture-like intervention this was stopped for a predefined dwell time at a position in the intervention region, and/or whether a predefined storage path in the intervention region has been covered with a predefined stored speed characteristic, and to generate the storage signal in the event of a storage requirement being detected.

\* \* \* \* \*